US012282605B2

United States Patent
Goldberg et al.

(10) Patent No.: US 12,282,605 B2
(45) Date of Patent: *Apr. 22, 2025

(54) HAPTIC CONTENT PRESENTATION AND IMPLEMENTATION

(71) Applicant: Disney Enterprises, Inc., Burbank, CA (US)

(72) Inventors: Evan M. Goldberg, Burbank, CA (US); Daniel L. Baker, Los Angeles, CA (US); Jackson A. Rogow, Beverly Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,068

(22) Filed: Feb. 10, 2023

(65) Prior Publication Data

US 2023/0221804 A1 Jul. 13, 2023

Related U.S. Application Data

(63) Continuation of application No. 17/125,353, filed on Dec. 17, 2020, now Pat. No. 11,604,516.

(51) Int. Cl.
*G06K 9/00* (2022.01)
*G06F 3/01* (2006.01)
(Continued)

(52) U.S. Cl.
CPC .............. *G06F 3/016* (2013.01); *G06F 3/041* (2013.01); *G06F 3/16* (2013.01); *G06V 10/462* (2022.01);
(Continued)

(58) Field of Classification Search
CPC . G06F 3/106; G06F 3/041; G06F 3/16; G06F 3/0416; G06F 3/016;
(Continued)

(56) References Cited

U.S. PATENT DOCUMENTS 8,573,979 B2 11/2013 Skinner
8,766,786 B2 7/2014 Radivojevic
(Continued)

FOREIGN PATENT DOCUMENTS

KR 101554256 B1 9/2015
WO 2020139091 A1 7/2020

OTHER PUBLICATIONS

Cool Blind Tech Inc., "Haptic Speaker Lets Blind and Visually Impaired People Read Braille in Midair." https://coolbindtech.com/haptic-speaker-lets-blind-and-visually-impaired-people-read-braille-in-midair/, date: May 31, 2020, 8 pages.

*Primary Examiner* — Abdul-Samad A Adediran
(74) *Attorney, Agent, or Firm* — Dorsey & Whitney LLP

(57) ABSTRACT

Systems and methods generating a haptic output response are disclosed. Video content is displayed on a display. A location of a user touch on the display is detected while the video content is being displayed. A region of interest in the video content is determined based on the location of the user touch. And a haptic output response is generated to a user. A characteristic of the haptic output response is determined using one or more characteristics of the region of interest.

18 Claims, 5 Drawing Sheets

(51) Int. Cl.
*G06F 3/041* (2006.01)
*G06F 3/16* (2006.01)
*G06V 10/46* (2022.01)
*G06V 20/40* (2022.01)
*G09B 21/00* (2006.01)
*G08B 3/00* (2006.01)
*G08B 6/00* (2006.01)

(52) U.S. Cl.
CPC ............ *G06V 20/46* (2022.01); *G09B 21/003* (2013.01); *G09B 21/007* (2013.01); *G08B 3/00* (2013.01); *G08B 6/00* (2013.01)

(58) Field of Classification Search
CPC .. G06F 3/04815; G06V 10/462; G06V 20/46; G09B 21/003; G09B 21/007; G08B 3/00; G08B 6/00; A61B 8/4254
USPC .................................................. 345/173, 419
See application file for complete search history.

(56) References Cited

U.S. PATENT DOCUMENTS

| | | |
|---|---|---|
| 9,372,095 B1 | 6/2016 | Chen et al. |
| 11,508,143 B2 | 11/2022 | Doggett |
| 2012/0262404 A1 | 10/2012 | Yamamoto et al. |
| 2014/0071117 A1* | 3/2014 | Schuckle ............... G06F 3/0416 345/419 |
| 2014/0139448 A1 | 5/2014 | Levesque et al. |
| 2014/0168124 A1 | 6/2014 | Park et al. |
| 2015/0097786 A1* | 4/2015 | Behles .................... G06F 3/016 345/173 |
| 2015/0280836 A1 | 10/2015 | Jin et al. |
| 2017/0090571 A1* | 3/2017 | Bjaerum .............. A61B 8/4254 |
| 2018/0322908 A1* | 11/2018 | Kim ....................... G06V 20/46 |
| 2019/0332175 A1 | 10/2019 | Väänänen et al. |
| 2020/0293176 A1* | 9/2020 | Yoganandan ....... G06F 3/04815 |
| 2021/0216126 A1 | 7/2021 | Dearman |

* cited by examiner

HAPTIC CONTENT PRESENTATION AND IMPLEMENTATION

CROSS REFERENCE TO RELATED APPLICATION

This application is a continuation of U.S. patent application Ser. No. 17/125,353, filed on Dec. 17, 2020, entitled "Haptic Content Presentation and Implementation", which is hereby incorporated by reference herein in its entirety.

BACKGROUND

Video content is viewed and enjoyed by hundreds of millions of people on a daily basis (e.g., on computers, smartphones, televisions, etc.). The blind or visually impaired, however, encounter challenges when consuming video. Because they cannot fully see the video, other techniques are used to communicate what is occurring in the video. For example, a descriptive audio track may play during different portions of the video to describe the events that are being shown in the video. These techniques, however, interfere with the presentation of the content. For example, the descriptive audio may conflict with the regular audio track for the video, as it is played over the top of the main audio track.

SUMMARY

According to an embodiment, a method includes displaying, on a touchscreen, a video comprising a video frame and determining, based on a saliency map of the video frame, a region of interest in the video frame. The method also includes detecting a touch on a region of the touchscreen while the video frame is displayed and generating a haptic response in response to determining that the region of the touchscreen overlaps with the region of interest. Other embodiments include an apparatus and a system that perform this method.

According to an embodiment, a method includes displaying video content on a display and detecting a location of a user touch on the display while the video content is displayed on the display. The method further includes determining a region of interest in the video content based on the location of the user touch and generating a haptic output response to a user, wherein a characteristic of the haptic output response is determined by one or more characteristics of the region of interest. Additionally or alternatively, embodiments include an apparatus or system that performs this method or one or more non-transitory computer-readable media carrying instructions that, when executed, cause a computing system to perform this method.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

This disclosure describes a system that helps the blind and visually impaired experience and enjoy video content. Generally, the system uses a saliency map to identify regions of interest in a video frame, which may correspond to objects in the video frame that are relevant to the subject of the video. A user may touch different regions of a video frame (e.g., using a touchscreen), and when the user touches one of these relevant objects, the user's device may generate a haptic response (e.g., a vibration) to provide feedback to the user that the user is touching a relevant object. In this manner, the blind or visually impaired user may understand what is happening in a video without using a descriptive audio track, in certain embodiments.

Figure 1:
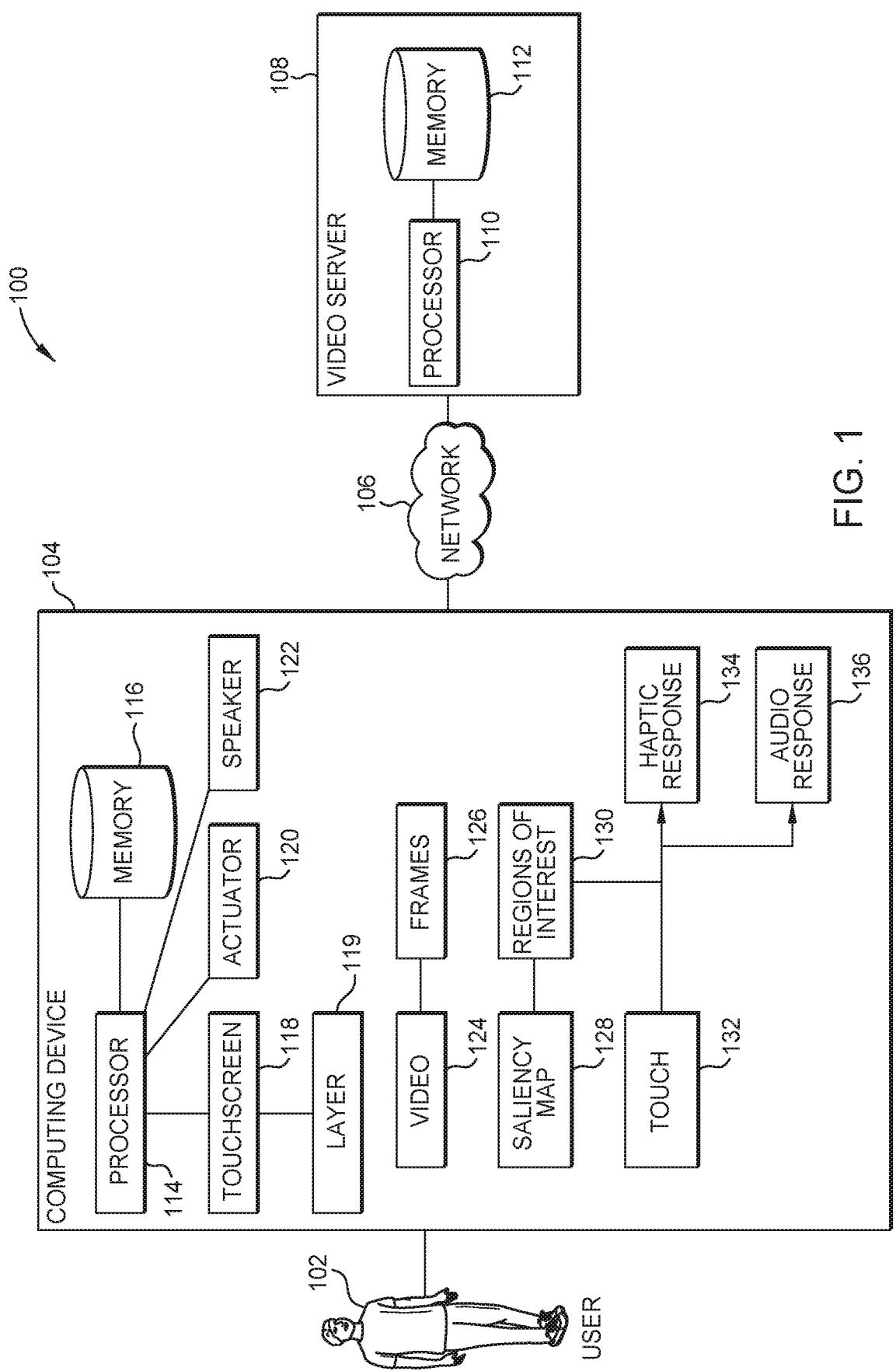
FIG. 1 illustrates an example system.

FIG. 1 illustrates an example system 100. As seen in FIG. 1, the system 100 includes a computing device 104, a network 106, and a video server 108. Generally, the computing device 104 generates haptic responses to touches on regions of interest in a video. In particular embodiments, the haptic responses assist a blind or visually impaired user 102 in understanding the spatial relationship of the contents or events in the video.

A user 102 uses the computing device 104 to interact with other components of the system 100. For example, the computing device 104 may receive and present video from the video server 108. Alternatively or additionally, the video may be stored in the memory of the computing device 104 or loaded directly onto the computing device 104 (e.g., via a portable storage medium, such as an optical disc or storage drive). When presenting the video to the user 102, the computing device 104 may detect a touch on a region of interest in the video. The computing device 104 may then generate a haptic response to alert the user 102 that the touch occurred on the region of interest. As seen in FIG. 1, the computing device 104 includes a processor 114, a memory 116, and a touchscreen 118, which may be configured to perform the actions and functions of the computing device 104 described herein. The computing device 104 further includes at least one of: (i) one or more layers 119 such as a conductive layer or an insulating layer provided, for example, on a surface of the touchscreen 118, (ii) an actuator 120, or (iii) a speaker 122. Some embodiments of the computing device 104 may not include every one of these components. For example, the computing device 104 may include only one of (i) the one or more layers 119, (ii) the actuator 120, or (iii) the speaker 122. In another example, the computing device 104 may include only two of (i) the one or more layers 119, (ii) the actuator 120), or (iii) the speaker 122. In yet another example, the computing device 104 can include each of (i) the one or more layers 119, (ii) the actuator 120), and (iii) the speaker 122. As another example, different embodiments of the touchscreen 118 may include different types of layers 119.

The computing device 104 includes any suitable device for communicating with components of the system 100 over the network 106. As an example and not by way of limitation, the computing device 104 may be a computer, a laptop, a wireless or cellular telephone, an electronic notebook, a personal digital assistant, a tablet, or any other device capable of receiving, processing, storing, or communicating information with other components of the system 100. The computing device 104 may be a wearable device such as a virtual reality or augmented reality headset, a smart watch, or smart glasses. The computing device 104 may be a videogame system or console. With respect to the touchscreen 118, touchscreen 118 may be physically integrated with the computing device 104 or may be communicatively coupled to but physically separate from the computing device 104. For example, where computing device 104 is implemented as a smartphone, laptop computer, or tablet computer, touchscreen 118 will typically be integrated with computing device 104. By contrast, where computing device 104 is implemented as a desktop computer, touchscreen 118 may take the form of a monitor separate from the computing device 104 in the form of a computer tower. The computing device 104 may also include a user interface, such as a microphone, keypad, or other appropriate terminal equipment usable by the user 102. The computing device 104 may include a hardware processor, memory, or circuitry configured to perform any of the functions or actions of the computing device 104 described herein. For example, a software application designed using software code may be stored in the memory and executed by the processor to perform the functions of the computing device 104.

The processor 114 is any electronic circuitry, including, but not limited to microprocessors, application specific integrated circuits (ASIC), application specific instruction set processor (ASIP), and/or state machines, that communicatively couples to memory 116 and controls the operation of the computing device 104. The processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 114 may include other hardware that operates software to control and process information. The processor 114 executes software stored on memory to perform any of the functions described herein. The processor 114 controls the operation and administration of the computing device 104 by processing information (e.g., information received from the video server 108, network 106, and memory 116). The processor 114 may be a programmable logic device, a microcontroller, a microprocessor, any suitable processing device, or any suitable combination of the preceding. The processor 114 is not limited to a single processing device and may encompass multiple processing devices.

The memory 116 may store, either permanently or temporarily, data, operational software, or other information for the processor 114. The memory 116 may include any one or a combination of volatile or non-volatile local or remote devices suitable for storing information. For example, the memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 116, a disk, a CD, or a flash drive. In particular embodiments, the software may include an application executable by the processor 114 to perform one or more of the functions described herein.

The touchscreen 118 may include a display and touch detection circuitry. Generally, the touch detection circuitry may be overlaid onto a portion of the display such that the touchscreen 118 may present visual information (e.g., a video) through the display and detect touches through the touch detection circuitry. The touchscreen 118 may present a video 124 to the user 102. The video 124 may be received from the video server 108 (e.g., through a stream). In certain embodiments, the video 124 may have been stored within the computing device 104 rather than being received from the video server 108. When the user 102 instructs the computing device 104 to play the video 124, the computing device 104 may present the video on the touchscreen 118. The video 124 includes individual image frames 126 that are played sequentially. Each frame 126 may be a still image. Playing the video 124 causes the computing device 104 to play these frames 126 in sequence on the touchscreen 118.

The computing device 104 may use a saliency map 128 to identify one or more regions of interest 130 in one or more frames 126 of the video 124. In particular embodiments, the video server 108 generates and communicates the saliency map 128 to the computing device 104. For example, the video server 108 may communicate the saliency map 128 in a stream, separate from the stream for the video 124. As another example, video server 108 may communicate the saliency map 128 in the same stream as the stream for the video 124, which may provide more reliable synchronization. In some embodiments, the computing device 104 may process the video 124 and the frames 126 to generate the saliency map 128, which may reduce the amount of data stored, processed, and transmitted by the video server 108. Generally, the saliency map 128 identifies one or more regions of interest 130 in a frame 126. The saliency map 128 may be generated using any suitable process, such as one or more of the processes described in U.S. application Ser. No. 16/840,201, which is incorporated herein by reference. In some embodiments, a human operator may manually generate saliency map 128 by tagging regions or objects of interest in the frames 126 of the video 124.

While the computing device 104 is playing the video 124, the user 102 may touch the touchscreen 118. When the user 102 touches the touchscreen 118, the touchscreen 118 may detect or register a touch 132. For example, the touchscreen 118 may detect that the touch 132 occurred and register the coordinates of the touch 132. The coordinates may indicate a region of the touchscreen 118 where the touch 132 is occurring. The computing device 104 may then determine whether a portion of the region of the touchscreen 118 where the touch 132 is occurring overlaps a portion of a region of interest 130 in the frame 126 as indicated by the saliency map 128. If a portion of the region of the touchscreen 118 where the touch 132 is occurring overlaps a portion of a region of interest 130, then the computing device 104 may generate a response to alert the user 102 that the user 102 is touching a region of interest 130. The computing device 104 may determine that the region of the touchscreen 118 where the touch 132 is occurring overlaps the region of interest 130 when the computing device 104 determines that these regions partially overlap or that one of these regions completely overlaps the other. Stated differently, this disclosure contemplates that regions overlap when the regions partially overlap or completely overlap.

The computing device 104 may use the actuator 120, touchscreen 118, or the speaker 122 to generate the response to the user 102. For example, the computing device 104 may use the actuator 120, the speaker 122, or the touchscreen 118 to generate a haptic response 134 that can be felt by the user 102 when touching the computing device 104. The actuator 120 may be any suitable actuator, such as a piezoelectric actuator or an electromagnetic actuator (e.g., a motor). The computing device 104 may activate the actuator 120 to generate the haptic response 134, which may be a mechanical vibration or pulse in the computing device 104. Alternatively or in addition to the using the actuator 120, the computing device 104 may activate the speaker 122 to generate the haptic response 134. The speaker 122 may generate a low frequency audio signal that causes a mechanical vibration or pulsing in the computing device 104. The user 102 may feel the mechanical pulsing or vibration generated by the actuator 120 or the low frequency audio signal (e.g., a vibration) from the speaker 122 when touching the computing device 104.

Alternatively or in addition to activating the actuator 120 or the speaker 122, the computing device 104 may use the touchscreen 118 to generate the haptic response 134. For example, the touchscreen 118 may include one or more layers 119, such as a conductive layer and a thin insulating layer. The layer(s) 119 may form a surface of the touchscreen 118, and the computing device 104 may communicate electric signals through one or more of the layers 119 (e.g., through a conductive layer) such that the electric signal causes the user 102 to experience a sensation when touching the touchscreen 118. For example, when the user 102 is touching the touchscreen 118, the electric signal may cause the user 102 to perceive a sensation that resembles the touchscreen 118 changing from smooth to rough (also known as electrovibration). Although the physical texture of the touchscreen 118 is not changing, the electric signal makes the user 102 feel like the texture of the touchscreen 118 is changing. As another example, the computing device 104 may communicate an electric signal that actually changes a physical texture of the touchscreen 118 (contrast with the previous example where the physical texture of the touchscreen 118 does not change, but the user 102 feels like the texture is changing). The touchscreen 118 may include one or layers 119 of material that changes physical texture based on the electric signal. For example, the touchscreen 118 may include magnetorheological fluid (e.g., contained in a layer 119) that changes shape (e.g., from round to sharp), texture (e.g., from smooth to bumpy or wavy), or hardness (e.g., from soft to hard) based on an electromagnet controlled by the electric signal. The user 102 may feel these texture changes when touching the touchscreen 118.

In certain embodiments the computing device 104 may vary certain aspects of the haptic response 134 based on the region of interest 130 that the user 102 is touching. For example, the computing device 104 may vary an intensity or a frequency of the haptic response 134 based on one or more of a size of an object in the region of interest 130, a curvature of the object, or a depth of the object in the video frame 126 (e.g., whether the object is in a foreground region, midground region, or background region of the frame 126). The computing device 104 may apply weights to one or more of these factors and vary the intensity or frequency of the haptic response 134 based on the weighted sum of these factors. As another example, the computing device 104 may vary an intensity or a frequency of the haptic response 134 based on a gradation of saliency of the region of interest 130 as indicated by the saliency map 128 (e.g., the more salient, important, or relevant a region of interest 130 is, the higher the intensity or frequency of the haptic response 134). In particular embodiments, by varying the haptic response 134, the computing device 104 may inform the user 102 of different characteristics of the region of interest 130. For example, the computing device 104 may inform the user 102 of a size, curvature, or depth of an object in the region of interest. As another example, the computing device 104 may inform the user 102 of a saliency, importance, or relevance of the region of interest 130.

In particular embodiments, the computing device 104 may use the speaker 122 to generate an audio response 136 that the user 102 hears when the touch 132 is occurring on a portion of the touchscreen 118 that overlaps with a portion of a region of interest 130. For example, the speaker 122 may play an audio signal (different from the low frequency signal generated for the haptic response 134) to generate the audio response 136. The audio response 136 provides an additional audible signal that alerts the user 102 that the touch 132 is occurring on the region of interest 130. In certain embodiments, the computing device 104 generates both the haptic response 134 and the audio response 136.

Like the haptic response 134, the computing device 104 may vary certain aspects of the audio response 136 based on the region of interest 130 that the user 102 is touching. For example, the computing device 104 may vary a volume or frequency of the audio response 136 based one or more of a size of an object in the region of interest 130, a curvature of the object, or a depth of the object in the video frame 126. In addition or alternatively, the computing device 104 may vary a volume or frequency of the audio response 136 based on a gradation of saliency of the region of interest 130 as indicated by the saliency map 128 (e.g., the more salient, important, or relevant a region of interest 130 is, the higher the volume or frequency of the audio response 136). In particular embodiments, by varying the audio response 136, the computing device 104 may inform the user 102 of different characteristics of the region of interest 130.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The video server 108 stores and communicates the video 124 to the computing device 104, in certain embodiments. As seen in FIG. 1, the video server 108 includes a processor 110 and a memory 112, which may be configured to perform any of the actions or functions of the video server 108 described herein. In particular embodiments, the video server 108 may communicate the video 124 to the computing device 104 in a stream.

The processor 110 is any electronic circuitry, including, but not limited to microprocessors, ASIC, ASIP, and/or state machines, that communicatively couples to memory 112 and controls the operation of the video server 108. The processor 110 may be 8-bit, 16-bit, 32-bit, 64-bit or of any other suitable architecture. The processor 110 may include an ALU for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on memory to perform any of the functions described herein. The processor 110 controls the operation and administration of the video server 108 by processing information (e.g., information received from the computing device 104, network 106, and memory 112). The processor 110 may be a programmable logic device, a microcontroller, a microprocessor, any suitable processing device, or any suitable combination of the preceding. The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include RAM, ROM, magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

In certain embodiments, the video server 108 generates and communicates the saliency map 128 to the computing device 104 in a stream. The video server 108 processes the frames 126 of the video 124 to generate the saliency map 128 using any suitable process. For example, the video server 108 may use one or more of the processes described in U.S. application Ser. No. 16/840,201, which is incorporated herein by reference.

Figure 2:
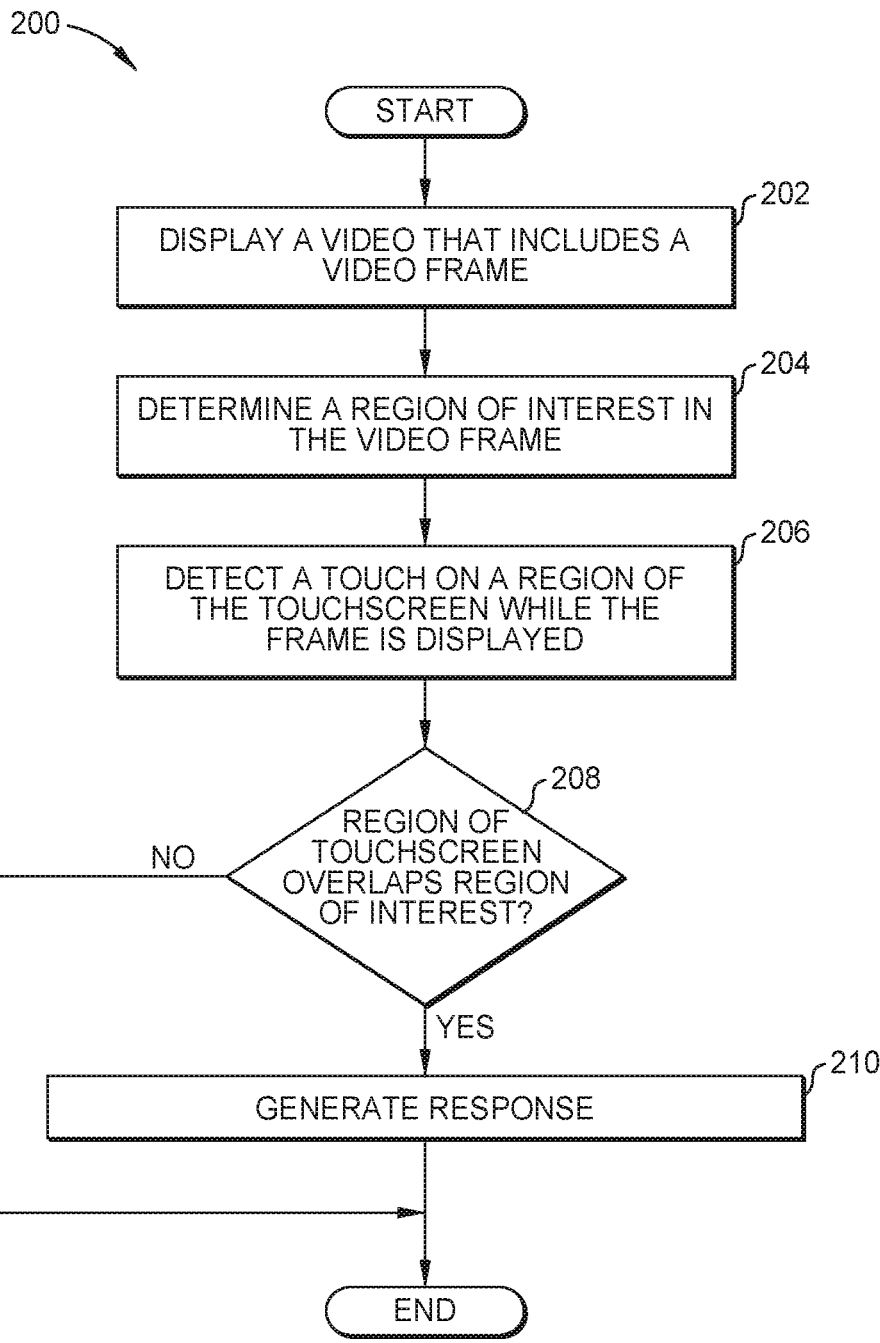
FIG. 2 is a flowchart of an example method in the system of FIG. 1.

FIG. 2 is a flowchart of an example method 200 in the system 100 of FIG. 1. Generally, the computing device 104 performs the method 200. In particular embodiments, by performing the method 200, the computing device 104 generates responses that assist a blind or visually impaired user 102 in understanding the contents or events in a video 124. Although the blocks of the method 200 are presented in a particular order in FIG. 2, the blocks of the method 200 may be performed in any suitable order. For example, some of the blocks may be performed in a different order (e.g., block 204 may be performed before block 202). As another example, some of the blocks may be performed concurrently (e.g., block 202 and block 206 may be performed concurrently).

In block 202, the computing device 104 displays a video 124 that includes a video frame 126. For example, the computing device 104 may display the video 124 and the video frame 126 on a touchscreen 118. The computing device 104 may have received the video 124 in a stream from a video server 108.

In block 204, the computing device 104 determines a region of interest 130 in the video frame 126. The computing device 104 may use a saliency map 128 to identify the region of interest 130. In certain embodiments, the computing device 104 may have received the saliency map 128 from the video server 108. For example, the video server 108 may have communicated the saliency map 128 to the computing device 104 in a stream separate from the stream for the video 124. In some embodiments, the computing device 104 may process the video 124 or the video frame 126 to generate the saliency map 128. Generally, the saliency map 128 indicates one or more regions of interest 130 in the video frame 126. These regions of interest 130 may include one or more objects in the video frame 126 that are determined to be salient or relevant. The computing device 104 or the video server 108 may use one or more processes described in U.S. application Ser. No. 16/840,201, which is incorporated herein by reference, to analyze the video frame 126 or the video 124 to identify these salient or relevant objects and to determine the region of interest 130.

In block 206, the computing device 104 detects a touch 132 on a region of the touchscreen 118 while the frame 126 is displayed. The touchscreen 118 may include touch detection circuitry that can detect the touch 132. The computing device 104 may detect the touch 132 and determine the coordinates of the touch 132. The coordinates may indicate a region of the touchscreen 118 where the touch 132 is occurring.

In block 208, the computing device 104 determines whether the region of the touchscreen 118 where the touch 132 is occurring overlaps a region of interest 130 indicated by the saliency map 128. Stated differently, the computing device 104 determines whether the user 102 is touching a region of interest 130 in the frame 126. If the user 102 is not touching a region of interest 130, the computing device 104 may conclude the method 200 without generating a response. If the user 102 is touching a region of interest 130, the computing device 104 generates a response in block 210. For example, the computing device 104 may generate a haptic response 134 that can be felt by the user 102. The computing device 104 may activate an actuator 120 to generate a mechanical vibration or pulse that the user 102 can feel when touching the computing device 104. As another example, the computing device 104 may activate the speaker 122 to generate a low frequency audio signal that creates a mechanical vibration or pulse that can be felt by the user 102 when touching the computing device 104. As another example, the computing device 104 may communicate an electric signal through a layer 119 of the touchscreen 118 such that when the user 102 is touching the layer 119, the electric signal causes the user 102 to perceive a sensation. This haptic response 134 alerts the user 102 that the user 102 is touching a region of interest 130, which assists the user 102 in understanding the contents or events within the video 124. Alternatively of additionally, the computing device 104 may generate an audio response 136 that can be heard by the user 102. The computing device 104 may activate a speaker 122 to generate an audio signal that can be heard by the user 102 to alert the user 102 that the user 102 is touching a region of interest 130. The audio response 136 assists the user 102 in understanding the contents or events within the video 124.

In certain embodiments the computing device 104 may vary certain aspects of the haptic response 134 based on the region of interest 130 that the user 102 is touching. For example, the computing device 104 may vary an intensity or a frequency of the haptic response based on a size of an object in the region of interest, a curvature of the object, or a depth of the object in the video frame 126. In addition or alternatively, the computing device 104 may vary an intensity or a frequency of the haptic response 134 based on a level of saliency of the region of interest 130 as indicated by the saliency map 128 (e.g., the more salient, important, or relevant a region of interest 130 is, the higher the intensity or frequency of the haptic response 134). In particular embodiments, by varying the haptic response 134, the computing device 104 may inform the user 102 of different characteristics of the region of interest 130.

Figure 3:
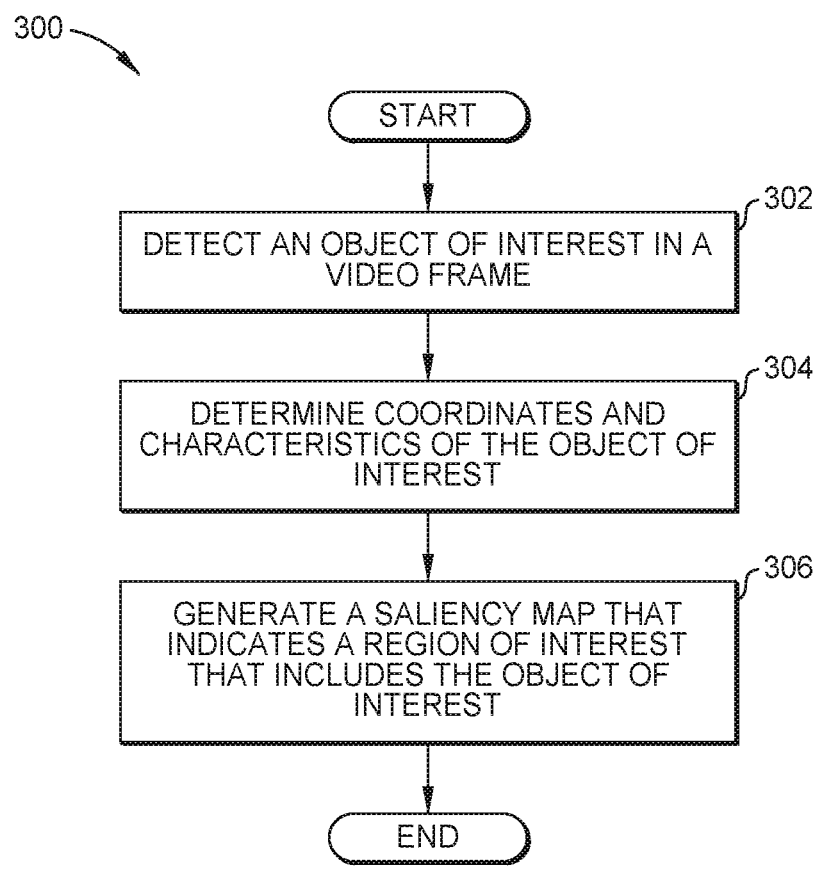
FIG. 3 is a flowchart of an example method in the system of FIG. 1.

FIG. 3 is a flowchart of an example method 300 in the system 100 of FIG. 1. The computing device 104 or the video server 108 may perform the method 300. In particular embodiments, by performing the method 300, the computing device 104 or the video server 108 generates a saliency map 128 that can be used to assist a blind or visually impaired user 102 in understanding the contents or events within a video 124. For example, the saliency map 128 may be used by the computing device 104 in block 204 of the method 200 to identify a region of interest 130 in a video frame 126. The, computing device 104 may then generate a haptic response 134 in block 210 of the method 300 when the user 102 touches the region of interest 130.

In block 302, the computing device 104 or the video server 108 detects an object of interest in a video frame 126. The object of interest (e.g. a person, an important object, etc.) may be an object in the video frame 126 that is relevant or important to the events occurring in the video frame 126. The computing device 104 or video server 108 may use any suitable process to detect the object of interest, such as one or more of the processes described in U.S. application Ser. No. 16/840,201, which is incorporated by reference herein.

In block 304, the computing device 104 or the video server 108 determines coordinates and characteristics of the object of interest. The coordinates indicate the position or location of the object of interest within the frame 126. The characteristics of the object of interest may include a size of the object of interest, a curvature of the object of interest, or a depth of the object of interest in the video frame 126. One or more of these characteristics may be used by the computing device 104 to generate a suitable haptic response 134 and/or audio response 136.

In block 306, the computing device 104 or video server 108 generates a saliency map 128 that indicates a region of interest 130 that includes the object of interest. For example, the computing device 104 or the video server 108 may use the coordinates of the object of interest to define the region of interest 130 in the saliency map 128. Additionally, the computing device 104 or the video server 108 may use the characteristics of the object of interest to determine a relevance or importance of the object of interest. The saliency map 128 may include a gradation of saliency that indicates the importance or relevance of the region of interest 130, corresponding to the relevance or importance of the object of interest. In this manner, the computing device 104 or video server 108 generates the saliency map 128, which may be later used to determine when a user 102 has touched a region of interest 130. In some embodiments, the saliency map 128 may indicate a gradation of saliency within a region of interest 130. For example, certain portions of a region of interest 130 may be more salient or important than other portions of the region of interest 130. The saliency map 128 may indicate how the saliency increases or decreases throughout the region of interest 130. When a user touches different portions of the region of interest 130, the computing device 104 may vary the response depending on the importance of that portion as indicated by the saliency map 128.

FIGS. 4-7 illustrate an example operation in the system 100 of FIG. 1. Generally, FIGS. 4-7 illustrate the operation of the computing device 104 when a user 102 touches a region of interest 130.

Figure 4:
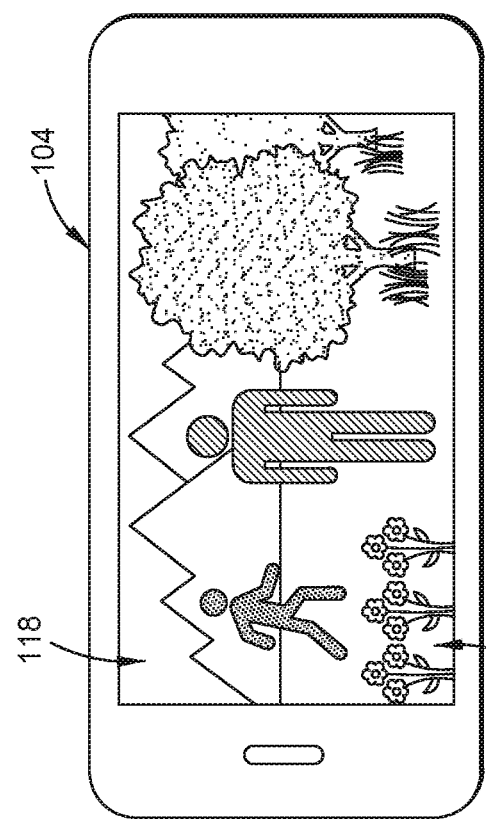
FIG. 4 illustrates an example video frame in the system of FIG. 1.

FIG. 4 illustrates an example video frame 126 in the system 100 of FIG. 1. As seen in FIG. 4, the computing device 104 includes a touchscreen 118 that displays the video frame 126. The video frame 126 includes two people within a nature setting. The computing device 104 may display the video frame 126 as part of playing a video 124.

Figure 5:
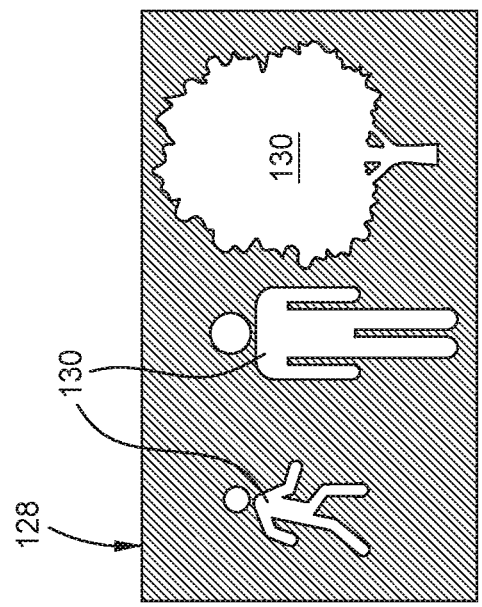
FIG. 5 illustrates an example saliency map in the system of FIG. 1.

FIG. 5 illustrates an example saliency map 128 in the system 100 of FIG. 1, which can be generated using the method 300 in FIG. 3. As seen in FIG. 5, the saliency map 128 identifies three regions of interest 130 in the video frame 126. The regions of interest 130 align with the two people in the video frame 126 and a tree in the video frame 126. In other words, the two people and the tree are the objects of interest in the video frame 126. As discussed previously, the computing device 104 may receive the saliency map 128 from the video server 108, or the computing device 104 may process the video frame 126 to generate the saliency map 128. The computing device 104 may use the saliency map 128 to determine when a user 102 has touched a region of interest 130 in the video frame 126.

Figure 6:
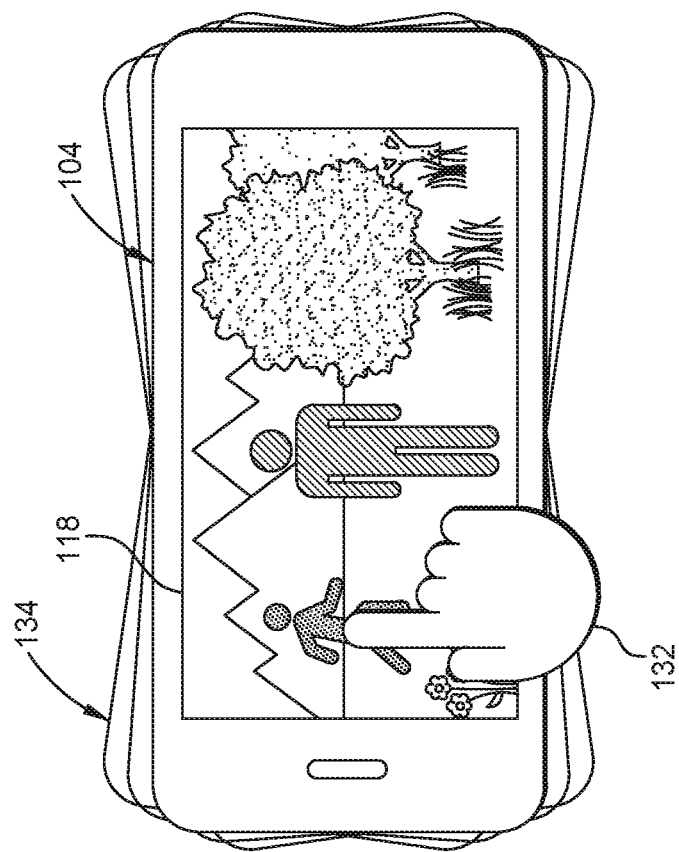
FIG. 6 illustrates an example touch detection in the system of FIG. 1.

FIG. 6 illustrates an example of touch detection in the system 100 of FIG. 1. As seen in FIG. 6, the computing device 104 detects a touch 132 on a region of the touchscreen 118. The touch 132 does not occur on one of the people or a tree in the video frame 126 (i.e., the touch 132 is outside of/does not overlap with any of the regions of interest 130). As a result, the computing device 104 does not generate a response, such as a haptic response 134 or audio response 136, to the touch 132.

Figure 7:
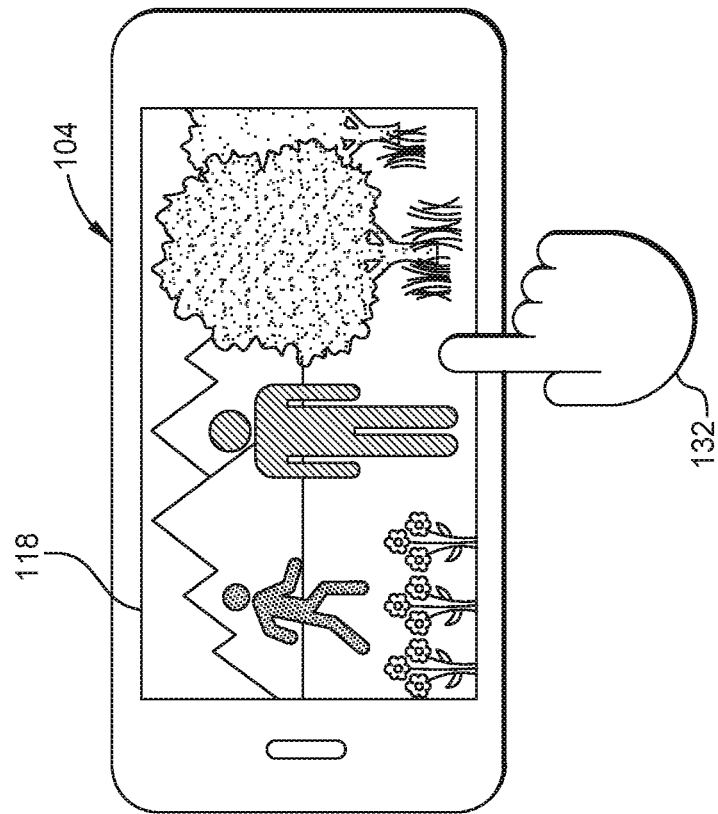
FIG. 7 illustrates an example haptic response in the system of FIG. 1.

FIG. 7 illustrates an example haptic response 134 in the system 100 of FIG. 1. As seen in FIG. 7, the computing device 104 detects a touch 132 on the touchscreen 118. Because the touch 132 is on one of the people in the video frame 126, the computing device 104 determines from the saliency map 128 that the touch 132 is on a region of the touchscreen 118 that overlaps with a region of interest 130 in the saliency map 128. This region of interest 130 corresponds with one of the people in the video frame 126. In response, the computing device 104 generates the haptic response 134. For example, the computing device 104 may activate a motor 120 or a speaker 122 to cause a mechanical vibration or pulse that can be felt by the user 102 when touching the computing device 104. In this manner, the computing device 104 alerts the user 102 that the user 102 is touching a region of interest 130 in the video frame 126. In particular embodiments, the haptic response 134 assists a blind or visually impaired user 102 in understanding the location of a salient element (i.e., one of the people) in the video frame 126.

In particular embodiments, the computing device 104 may vary certain aspects of the haptic response 134 based on characteristics of the touched region of interest 130. For example, the computing device 104 may vary in intensity or frequency of the haptic response 134 based on a size of an object in the touched region of interest 130, a curvature of the object in the touched region of interest 130, a depth of the object in the region of interest 130 in the video frame 126, a gradation of saliency of the touched region of interest 130, or a combination thereof. The intensity or frequency of the haptic response 134 may also vary based on a relative importance of the objects touched. For example, in FIGS. 4-7, the person in the foreground may be more salient, important, or relevant than the person in the background such that a touch on the person in the foreground is associated with a higher intensity or frequency of the haptic response 134 than a touch on the person in the background. In the same example, both people may be more important than the tree such that a touch on the person in the foreground is associated with a higher intensity or frequency of the haptic response 134 than a touch on the person in the background, and a touch on the person in the background is associated with a higher intensity or frequency of the haptic response 134 than a touch on the tree. By varying these aspects of the haptic response 134, the computing device 104 may communicate one or more of these characteristics of the region of interest 130 to a blind or visually impaired user 102.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++, Swift, Objective-C, C#, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:
1. A method comprising:
receiving a saliency map of a frame of video content, the saliency map including a plurality of defined regions of interest in the frame of the video content;

displaying the video content on a display, wherein the plurality of defined regions of interest of the saliency map correspond to locations on the display;

detecting a location of a user touch on the display that overlaps a defined region of interest of the plurality of defined regions of interest of the saliency map while the frame of the video content is displayed on the display;

determining a region of interest of the plurality of defined regions of interest in the video content based on the location of the user touch and the saliency map; and generating a haptic output response to a user, wherein a characteristic of the haptic output response is determined by one or more characteristics of the region of interest.

2. The method of claim 1, wherein the characteristic of the haptic output response is based on an object in the region of interest.

3. The method of claim 2, wherein the characteristic of the haptic output response is based on at least one of a size of the object, a depth of the object within the video content, or a shape of the object.

4. The method of claim 2, further comprising:
generating an audio response to the user, wherein the audio response is based on at least one of a size of the object, a depth of the object within the video content, or a shape of the object.

5. The method of claim 1, further comprising:
varying the characteristic of the haptic output response based on the region of interest to inform the user of the one or more characteristics of the region of interest.

6. The method of claim 4, further comprising:
varying an aspect of the audio response based on the region of interest to inform the user of the one or more characteristics of the region of interest.

7. The method of claim 1, wherein the characteristic of the haptic output response includes an intensity or a frequency.

8. The method of claim 7, wherein the intensity or the frequency are based on a relevance of the region of interest relative to at least one other of the plurality of defined regions of interest in the video content.

9. A system, comprising:
a display;
at least one hardware processor; and
at least one non-transitory memory carrying instructions that, when executed by the at least one hardware processor, cause the system to:
receive a saliency map of a frame of video content, the saliency map including a plurality of defined regions of interest in the frame of the video content;
display the video content on the display, wherein the plurality of defined regions correspond to locations on the display;
detect a location of a user touch on the display while the frame of the video content is displayed on the display;
determine a particular region of interest of the plurality of defined regions of interest in the video content based on the location of the user touch overlapping the particular region of interest as defined in the saliency map; and
generate a haptic output response to a user, wherein a characteristic of the haptic output response is determined by one or more characteristics of the region of interest.

10. The system of claim 9, wherein the characteristic of the haptic output response is based on an object in the particular region of interest.

11. The system of claim 10, wherein the characteristic of the haptic output response is based on at least one of a size of the object, a depth of the object within the video content, or a shape of the object.

12. The system of claim 10, wherein the instructions further cause the system to:
generate an audio response to the user, wherein the audio response is based on at least one of a size of the object, a depth of the object within the video content, or a shape of the object.

13. The system of claim 9, wherein the instructions further cause the system to:
vary the characteristic of the haptic output response based on the particular region of interest to inform the user of the one or more characteristics of the region of interest.

14. The system of claim 12, wherein the instructions further cause the system to:
vary an aspect of the audio response based on the particular region of interest to inform the user of the one or more characteristics of the region of interest.

15. The system of claim 9, wherein the characteristic of the haptic output response includes an intensity or a frequency.

16. The system of claim 15, wherein the intensity or the frequency are based on a relevance of the particular region of interest relative to at least one other of the plurality of defined regions of interest in the video content.

17. At least one non-transitory computer-readable medium carrying instructions that, when executed by a computing system, cause the computing system to perform operations comprising:
receiving a saliency map of a frame of video content, the saliency map including a plurality of defined regions of interest in the frame of the video content;
displaying the video content on a display, wherein the plurality of defined regions of interest correspond to locations on the display;
detecting a location of a user touch on the display that overlaps a defined region of interest of the plurality of defined regions of interest of the saliency map while the frame of the video content is displayed on the display;
determining a region of interest of the plurality of defined regions of interest in the video content based on the location of the user touch and the saliency map; and
generating a haptic output response to a user, wherein a characteristic of the haptic output response is determined by one or more characteristics of the region of interest.

18. The at least one non-transitory computer-readable medium of claim 17, wherein the haptic output response is based on an object in the defined region of interest, and wherein the operations further comprise:
varying the characteristic of the haptic output response to inform the user of the one or more characteristics of the defined region of interest.

* * * * *